United States Patent [19]
Yunker

[11] Patent Number: 6,147,693
[45] Date of Patent: Nov. 14, 2000

[54] LOCALIZABLE DATE TIME SPINNER

[75] Inventor: John W. Yunker, Collins, Colo.

[73] Assignee: Hewlett-Packard Company, Palo Alto, Calif.

[21] Appl. No.: 09/087,363

[22] Filed: May 29, 1998

[51] Int. Cl.[7] .................................................. G06F 15/00
[52] U.S. Cl. .............................................................. 345/473
[58] Field of Search ..................... 345/473, 474, 345/475, 433, 118, 121

[56] References Cited

U.S. PATENT DOCUMENTS

| | | | |
|---|---|---|---|
| 5,396,305 | 3/1995 | Egawa | 354/76 |
| 5,428,736 | 6/1995 | Kahl et al. | 395/349 |
| 5,602,997 | 2/1997 | Carpenter et al. | 395/349 |
| 5,734,597 | 3/1998 | Molnar et al. | 364/705.08 |

*Primary Examiner*—Phu K. Nguyen

[57] ABSTRACT

A localizable date/time spinner mechanism and method allows a user to select a field in a date or time, select a spin direction, and spin through the selected date/time field in accordance with the enumerated field type. The date/time and selected fields are displayed according to the customs and conventions of the user's default locale as defined in the user's operating environment. This allows the date/time spinner run on any platform and display the date/time in the format of the user's locale.

9 Claims, 12 Drawing Sheets

LOCALIZABLE DATE TIME SPINNER

FIELD OF THE INVENTION

The present invention pertains generally to internationalization of software applications, and, more particularly, to a locale independent date/time spinner method and mechanism.

BACKGROUND OF THE INVENTION

Increasingly, software application programmers must implement locale awareness functionality into applications in order to generate global programs. A global program is a program that can be run anywhere in the world and which tailors the presentation of information to the user according to the user's preferred language and customs. A locale is a geographic, political, or cultural region that shares the same language and customs. If an application is localized properly, the code is easily translatable to different locales without modification of the actual code. A properly localized application is able to run under any supported locale simply by changing the default locale object. Internationalization is the process of isolating the language- and format-dependent code in a computer program from the language- and format-independent code. Once internationalized, the program can be easily localized for each target locale to create a truly global program.

An operation that requires a locale object to perform its task or to tailor information for the user is called Alocale-sensitive@. An example of a locale-sensitive operation is the displaying of a date or time. A date or time should be formatted according to the customs and conventions of the user's locale. For example, if the locale country is the United States and the locale language is English, a date is displayed as "month-day-year"; whereas if the locale country is France and the locale language is French, the (late is displayed as "day-month-year". Furthermore, if the month is displayed in text, or abbreviated text, format rather than numeric format, the months are displayed in the language of the locale. So, for example, a date "Jan. 1, 1900" may be displayed as "1 janvier 1900" in France. When displaying time, some locales display the clock using 24-hour formats, while others display the clock using time-of-day "a.m." and "p.m." conventions.

Heretofore, a localizable date time spinner which allows a user to easily select and scroll through portions of a date or time independent of the default locale, has been unavailable. Instead, date time spinners have been independently created for each locale that the program is supported for. This is problematic for two reasons: first, an independent copy of the same program must be maintained for each locale that is supported; second, this technique requires a significant amount of engineering time to locate and modify all of the locale-specific features, including the language and date and time formats, of the date time spinner for each locale. Accordingly, a need exists for a locale independent date time display mechanism.

SUMMARY OF THE INVENTION

The present invention is a locale independent date time display mechanism, or date/time spinner, that allows a user to select a field of a date/time panel to adjust, and then spin through the succeeding or preceding enumerated field values of the selected date/time field. The date/time is displayed in the format of the user's specified locale. In one embodiment, the date time spinner is implemented in Java® and is localized to the default locale of the user's operating environment.

In accordance with an illustrative embodiment of the invention, the localizable date time spinner is implemented as a Java® TimeDateSpinner class. During initialization the TimeDateSpinner class obtains the locale's specified date/time format from the DateFormat class. This format string is used to format the date properly. The formatted date is then used to build another format pattern which matches the date string entirely. For example, a format string for the default locale might be "dd-MMMM-yyyy". If the formatted date is "01-January-1997", the format pattern is generated as "dd-MMMMMMM-yyyy". The format pattern is then used to ensure that when a user selects the day, month, or year, that only the proper segment of the format pattern is selected. A DateSpinner class keeps track of where in the format pattern the user clicks their mouse button and highlights the appropriate portion of the formatted date using the generated format pattern. When the user selects the up or down button, a SpinnerButton class updates, or "spins", the date to the next appropriate value, which is then displayed via the user interface.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

Figure 1:
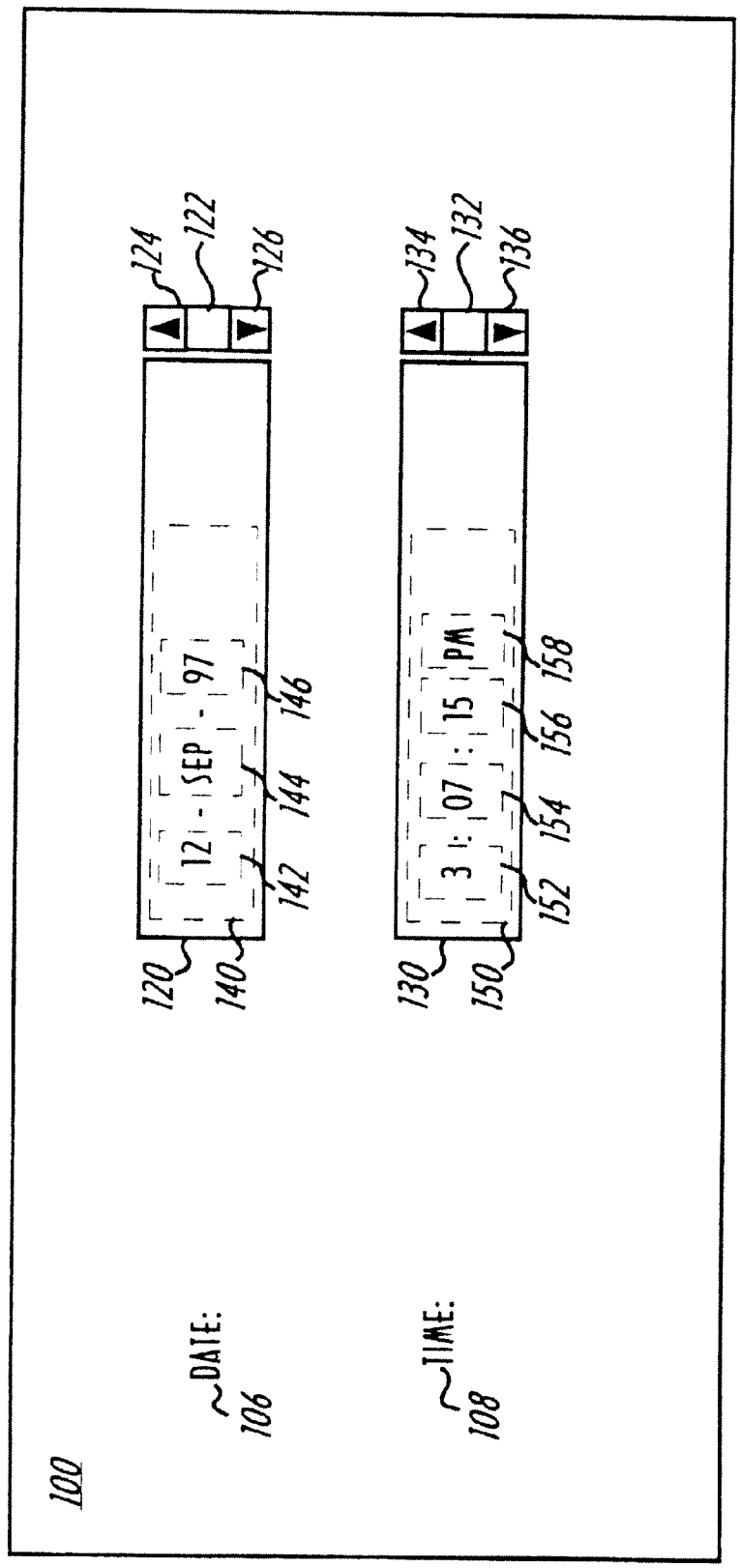
FIG. 1 is a diagram of a user interface display in a United States locale in accordance with the invention.

FIG. 1 is an illustrative embodiment of a user interface display 100 in accordance with one portion of the invention which displays information in a format appropriate to a United States locale. Display 100 includes labels, shown respectively as date label 106 and time label 108. Display 100 includes a date panel 120, which displays a date 140 comprising a day field 142, a month field 144, and a year field 146. In the illustrated embodiment, date panel is in the format "d - MMM - yy", where day field 142 is "d", month field 144 is "MMM", and year field 146 is "yy". Date panel 120 is scrollable via a date scrollbar 122 that preferably includes an up button 124 and a down button 126 for selecting the desired scrolling direction. Display 100 also includes a time panel 130, which displays a time 150 comprising an hour field 152, a minutes field 154, a seconds field 156, and, depending on the locale and desired display format, a time-of-day field 158 (e.g., "AM" or "PM"). In the illustrated embodiment, time panel 130 is in the format "hh:mm:ss a", where hour field 152 is "hh", minutes field 154 is "mm", seconds field 156 is "ss", and time-of-day field 158 is "a". Time panel 130 is scrollable via a time scrollbar 132 that preferably includes an up button 134 and a down button 136 for selecting the desired scrolling direction. The formats of date 140 and time 150 are formatted accordingly to the default locale as derived from the user's operating environment.

In operation, the user selects a field of a date/time panel, e.g., month field 144 of date panel 120, by clicking on the desired portion of the panel, or via an appropriate keyboard command. The user then operates the appropriate scrollbar, e.g. date panel scrollbar 122, to spin the selected portion of the panel forward or backward as directed. Accordingly, in the example of FIG. 1, selecting month field 144 and clicking up button 124 of date scrollbar 122 results in the month field 144 displaying the next month, "OCT". Similarly, clicking down button 126 of date scrollbar 122 results in a display change from "SEP" to "AUG".

Figure 2:
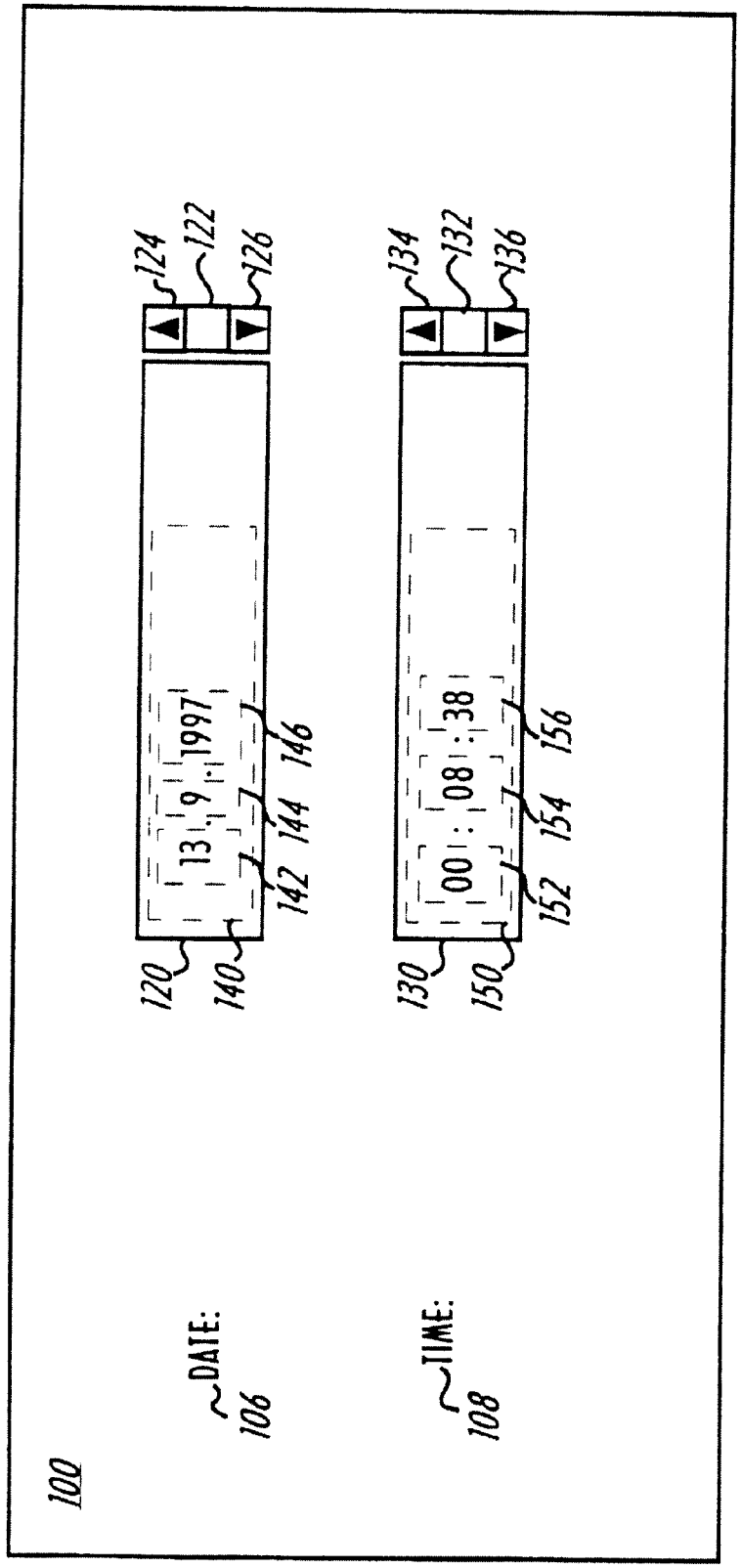
FIG. 2 is a diagram of a user interface display in a German locale in accordance with the invention.

FIG. 2 is an illustrative embodiment of user interface display 100 in accordance with one portion of the invention which displays information in a format appropriate to a German locale. In the German locale, date panel 120 is displayed as "dd.M.yyy", where "dd" is day field 142, "M" is month field 144, and "yyy" is year field 146. In the German locale, month field 144 and day field 142 are reversed, and month field 144 is a numeric representation rather than a text representation. Furthermore, the field separator is a period "." Rather than a dash "-". In addition, the time 130 is displayed using a 24-hour clock format rather than the time of day "AM" and "PM" format.

Figure 3:
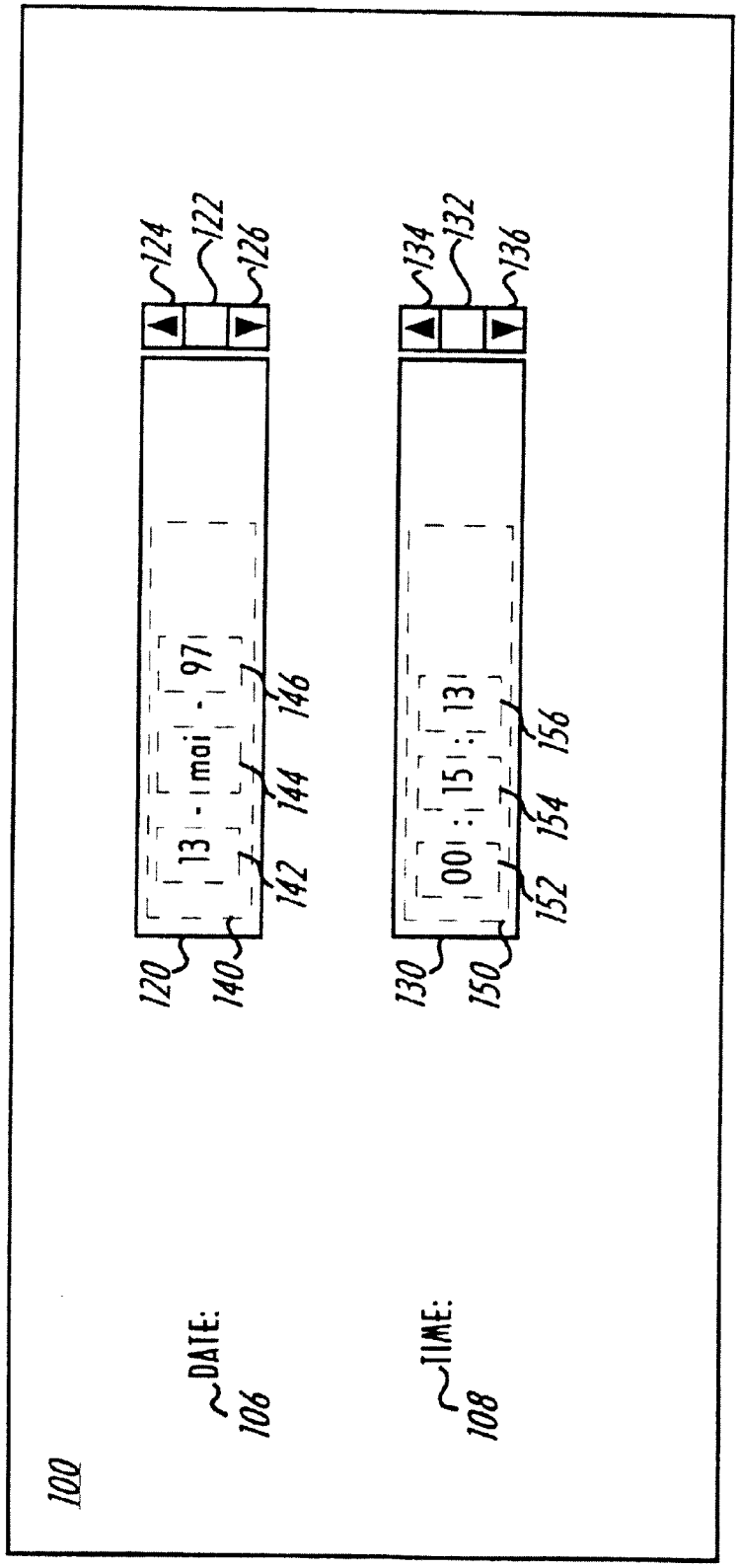
FIG. 3 is a diagram of a user interface display in a French locale in accordance with the invention.

FIG. 3 is an illustrative embodiment of user interface display 100 in accordance with one portion of the invention which displays information in a format appropriate to a French locale. In the French locale, date panel 120 is displayed as "d MMM yy", where "dd" is day field 142, "MMM" is month field 144, and "yy" is year field 146. In the French locale, month field 144 and day field 142 are reverse of the order in the U.S. locale of FIG. 1. Also, month field 144 is an abbreviated text representation rather than a full text representation. Furthermore, the field separator is a space"" rather than a dash "-". In addition, the time 130 is displayed using a 24-hour clock format rather than the tod "AM" and "PM" format.

Localization of time and date formats is further complicated by the fact that each locale may have more than one acceptable date and time format from which to choose. For example, in the U.S. locale, acceptable date formats for a given date, e.g., Dec. 31, 1999, include: "December 31, 1999", "31-DEC-99", "12/31/99", and so forth. Accordingly, even in the same locale, the position and number of characters of the month field 144, day field 142 and year field 146 can vary. A similar problem occurs with time formats.

The date time spinner of the invention is preferably implemented as a Java® class using the well-known Java® programming language of Sun Microsystems, Inc. Java® provides utility objects, namely of class Locale and class ResourceBundles, that facilitate code internationalization. A locale object is an identifier for a region; it does not contain any application-specific data for that region. The application-specific data is contained in resource bundles. In the illustrative embodiment, the date/time spinner uses the locale object created by the user's Java® Runtime Environment to identify what the current locale is and to decide which resource bundle to use to construct its display. The current locale is obtained by performing a method call getLocale() on the locale object. Once the date/time spinner obtains a locale object, it can obtain information from it about the locale, such as the country (using method getCountry), language (using method getLanguage).

Figure 4:
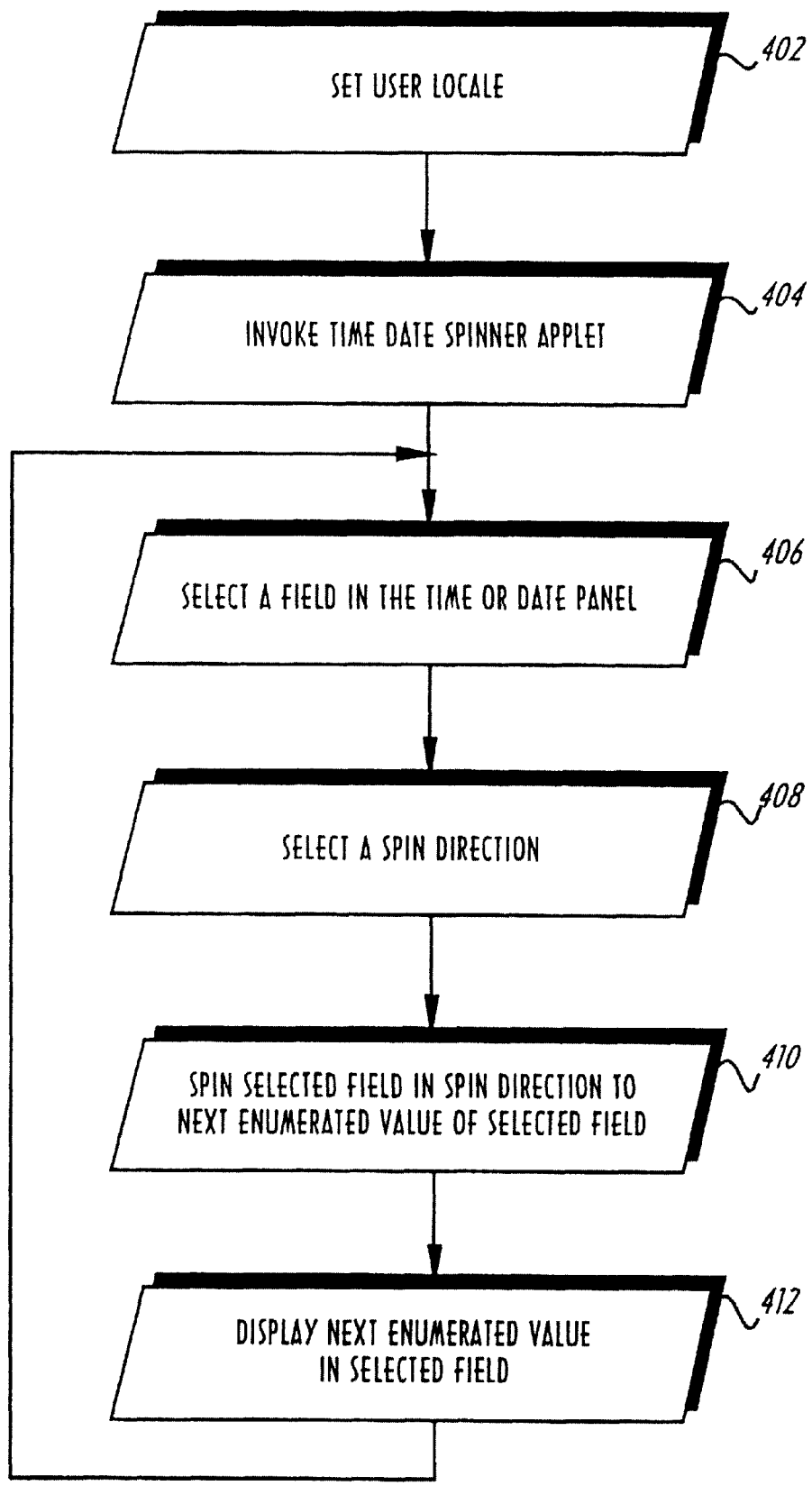
FIG. 4 is a flowchart of a method of user interaction with the localizable date/time spinner of the invention.

FIG. 4 is a flowchart of a method of user interaction with the localizable date/time spinner of the invention. In a first step 402, the user's locale is set. In the illustrative embodiment, this is accomplished during the initialization of the user's local Java® Runtime Environment. The default locale may be changed by performing a setLocale method on the user's Locale object. In a step 404 the user starts up a date time spinner process. In the illustrative embodiment, the date time spinner process is implemented in the Java® programming language, and is invoked via a mouse click on a hyperlink or associated icon, an appropriate command from a command line, or by a method call from another object. The date time spinner displays a date time spinner frame, such as those shown in FIGS. 1–3. In a step 406, the user selects a field in one of the time or date panels 120, 130. After selecting a field, the user selects a spin direction in a step 408. The date/time spinner of the invention then determines in the next enumerated value for the selected field in the direction appropriate to the selected arrow in step 410. For example, if the user selected month field 144 and up arrow 124, the displayed month is incremented to the next month. If the down arrow 126 is selected, however, the displayed month is decremented to the preceding month. In step 412, the date/time spinner then formats the field according to the user's locale, determines the boundaries of the selected field appropriate to the format of the default locale, and displays the next enumerated value in the selected field of the user's display.

Figure 5:
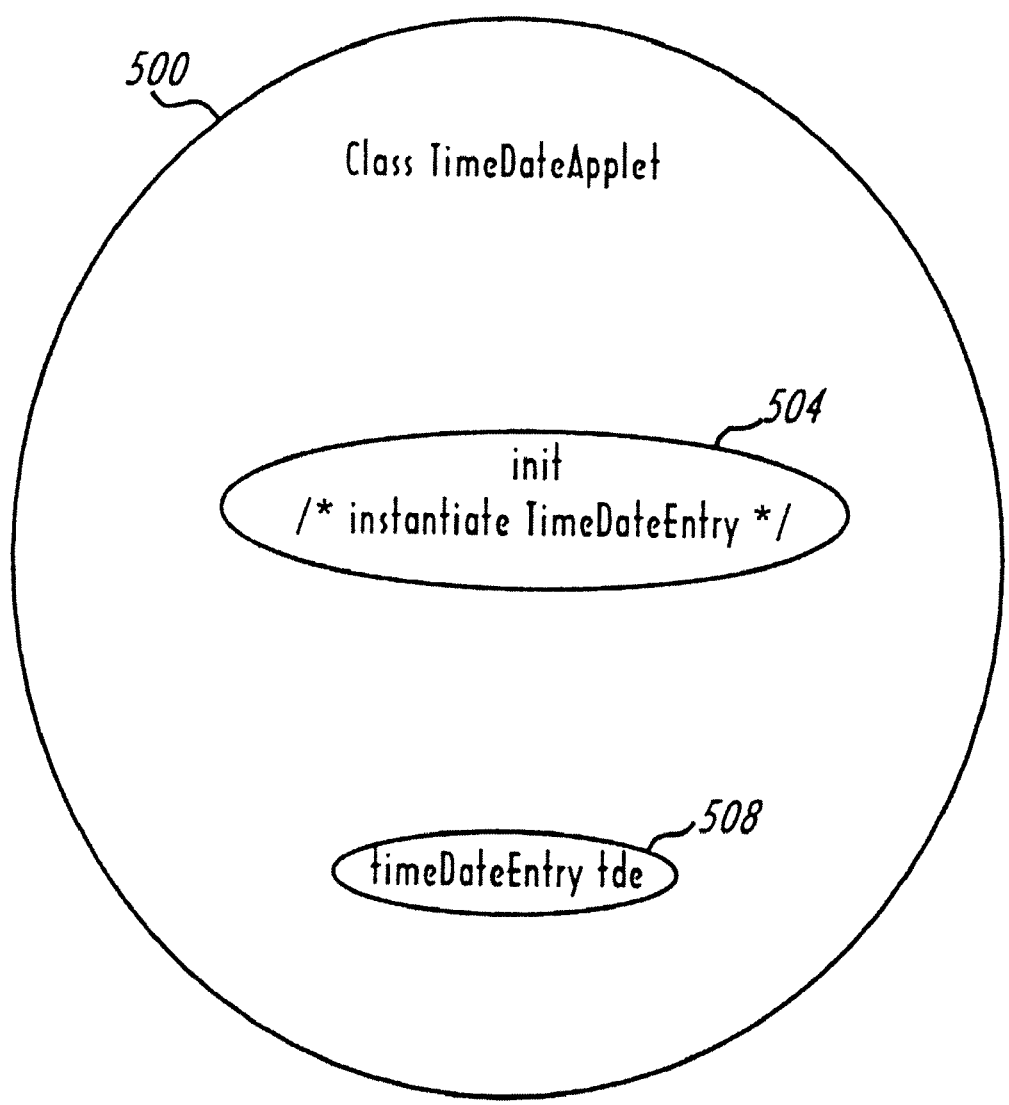
FIG. 5 is a block diagram of an example TimeDateApplet class in accordance with the invention.

FIG. 5 is a block diagram of an example TimeDateApplet class 500 in accordance with the invention. TimeDateApplet class 500 includes public methods, including an initialization function "init" 504. An illustrative embodiment of the Java® class definition of class TimeDateApplet 500 is shown in Appendix A at Section A.1.

Figure 6:
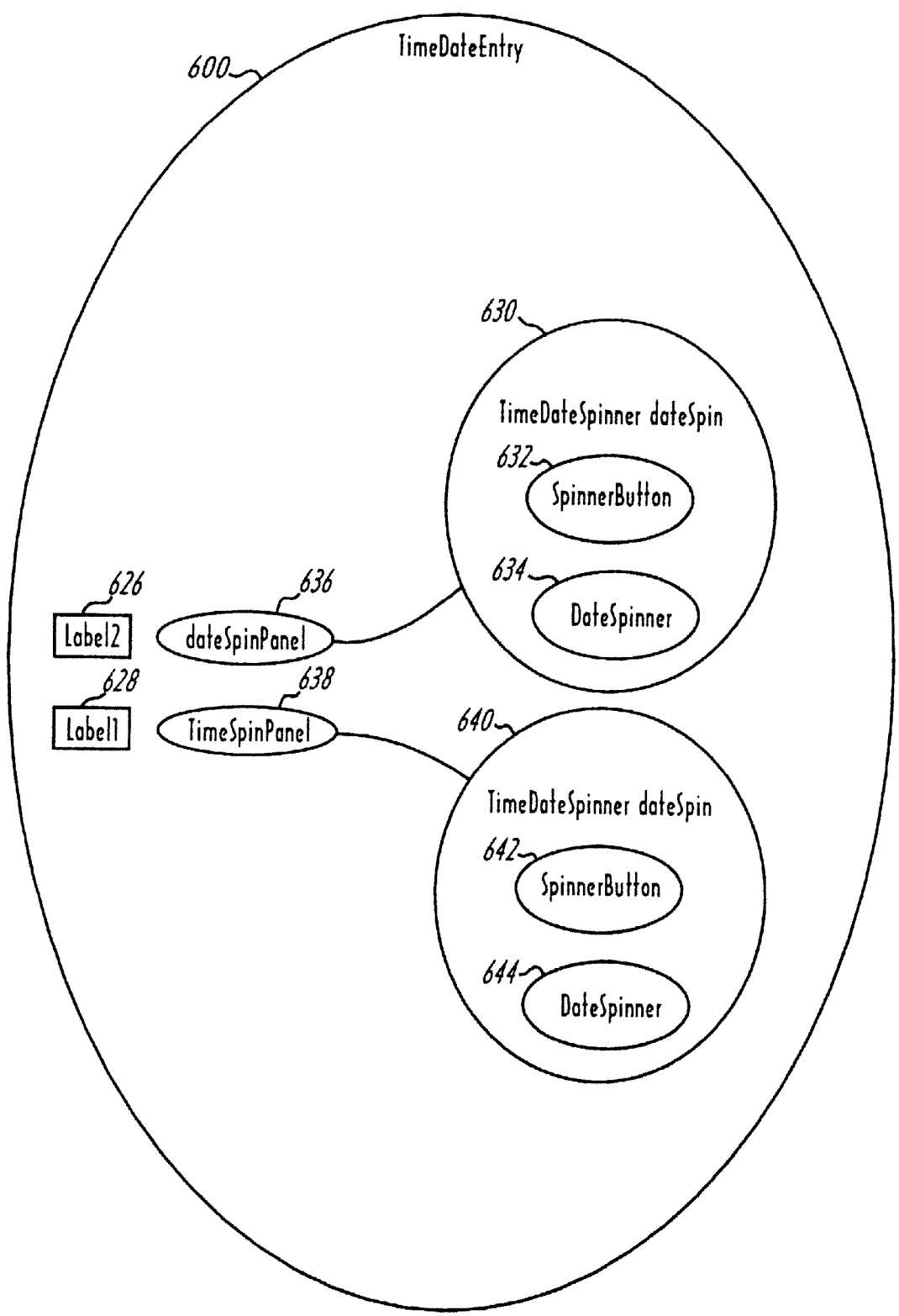
FIG. 6 is a block diagram of an instance of a date time object TimeDateEntry.

FIG. 6 is a block diagram of an instance of a date time object, labeled TimeDateEntry 600, that implements both a date spinner and a time spinner, illustrated in accordance with user interface display 100 of FIGS. 1–3. TimeDateEntry 600 includes label variables Label1 624 and Label2 626, which are respectively represented in display 100 as date label 106 and time label 108. TimeDateEntry 600 also includes an instance 636 of a Java® Panel object which implements the display of date panel 120, and an instance 638 of another Java® Panel object which implements the display of time panel 130 of display 100. TimeDateEntry 600 also includes a date spinner instance 630 of a TimeDateSpinner object which implements the date spin panel functionality of date panel 120 in FIGS. 1–3 using an instance 632 of a SpinnerButton object and an instance 634 of a DateSpinner object. Similarly, TimeDateEntry 600 also includes a time spinner instance 640 of a TimeDateSpinner object which implements the time spin panel functionality of time panel 130 in FIGS. 1–3 using an instance 642 of a SpinnerButton object and an instance 644 of a DateSpinner object.

In operation, date spinner object 630 listens for user input, generally via a mouse interface, to detect when and which fields of date 140 are selected and causes dateSpinPanel object 636 to update the user's display to reflect the selected and or deselected status of each of the date fields 142, 144 and 146. SpinnerButton instance 632 listens for mouse clicks on the scrollbar, decodes the meaning of the mouse clicks, causes the DateSpinner object 634 to spin to the next enumerated value as determined by the selected direction, and causes dateSpinPanel 636 to update the display of the selected field to reflect the next enumerated value. Time spinner object 640 operates similarly but spins a time instead of a date.

Figure 7:
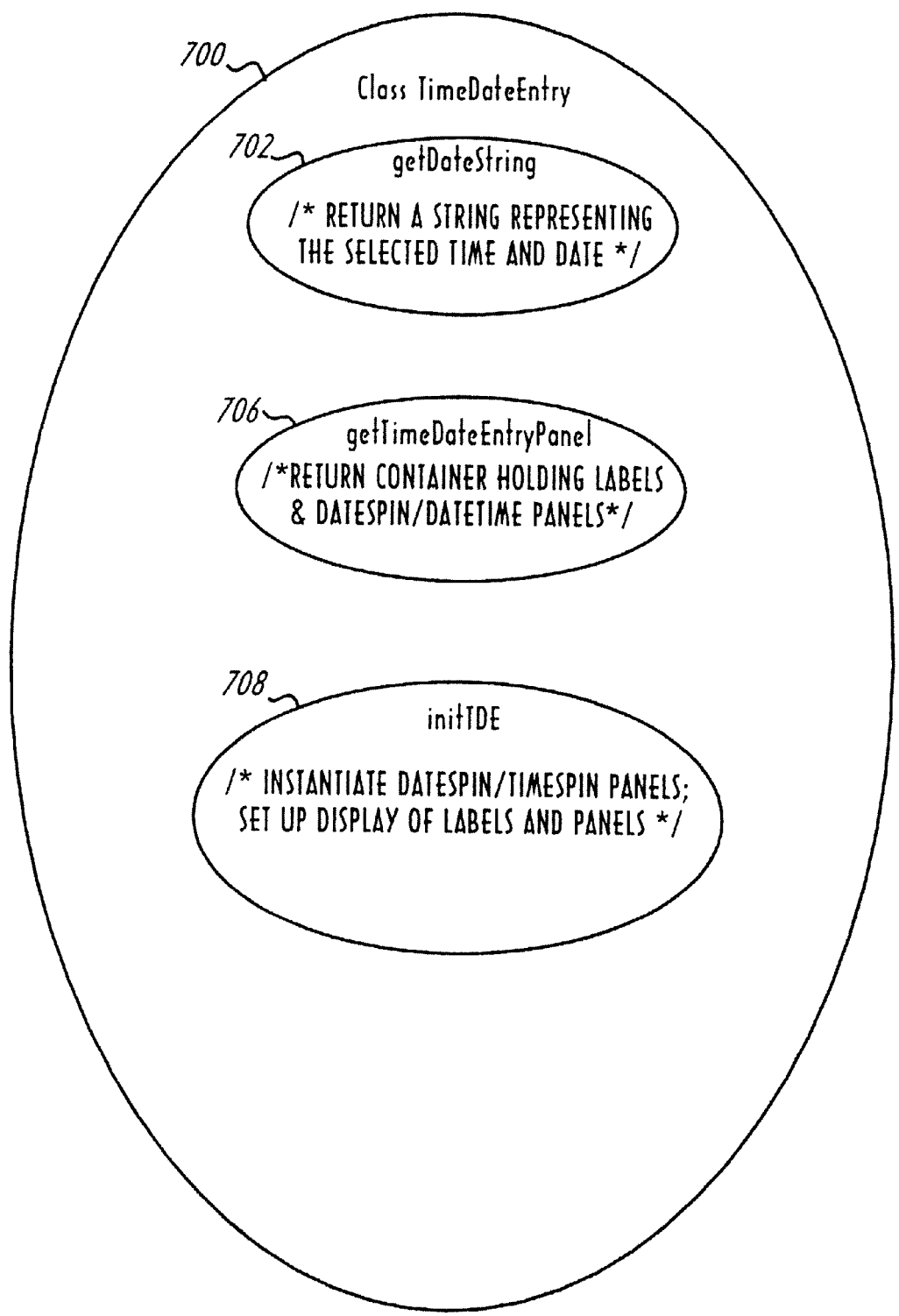
FIG. 7 is a block diagram of an example TimeDateEntry class 700 in accordance with the invention.

FIG. 7 is a block diagram of an example TimeDateEntry class 700 in accordance with the invention. TimeDateEntry class 700 includes public methods getDateString 702, getCompareOp 704, getTimeDateEntryPanel 706, and initTDE 708. Method initTDE 708 instantiates a TimeDateSpinner object 630 which implements date spin panel 120, and instantiates another TimeDateSpinner object 640 which implements time spin panel 130. Method initTDE 708 also sets up the positions and sizes of each of date label 106 and time label 108, as well as date panel 120 and time panel 130. Method getDateString 702 returns a string representing the selected time and date. Method getTimeDateEntryPanel 706 returns the containing border panel for the date 140 or time 150. Illustrative embodiments of the Java® class definition of class TimeDateEntry 700 is shown in Appendix A at Section A.2.

Figure 8:
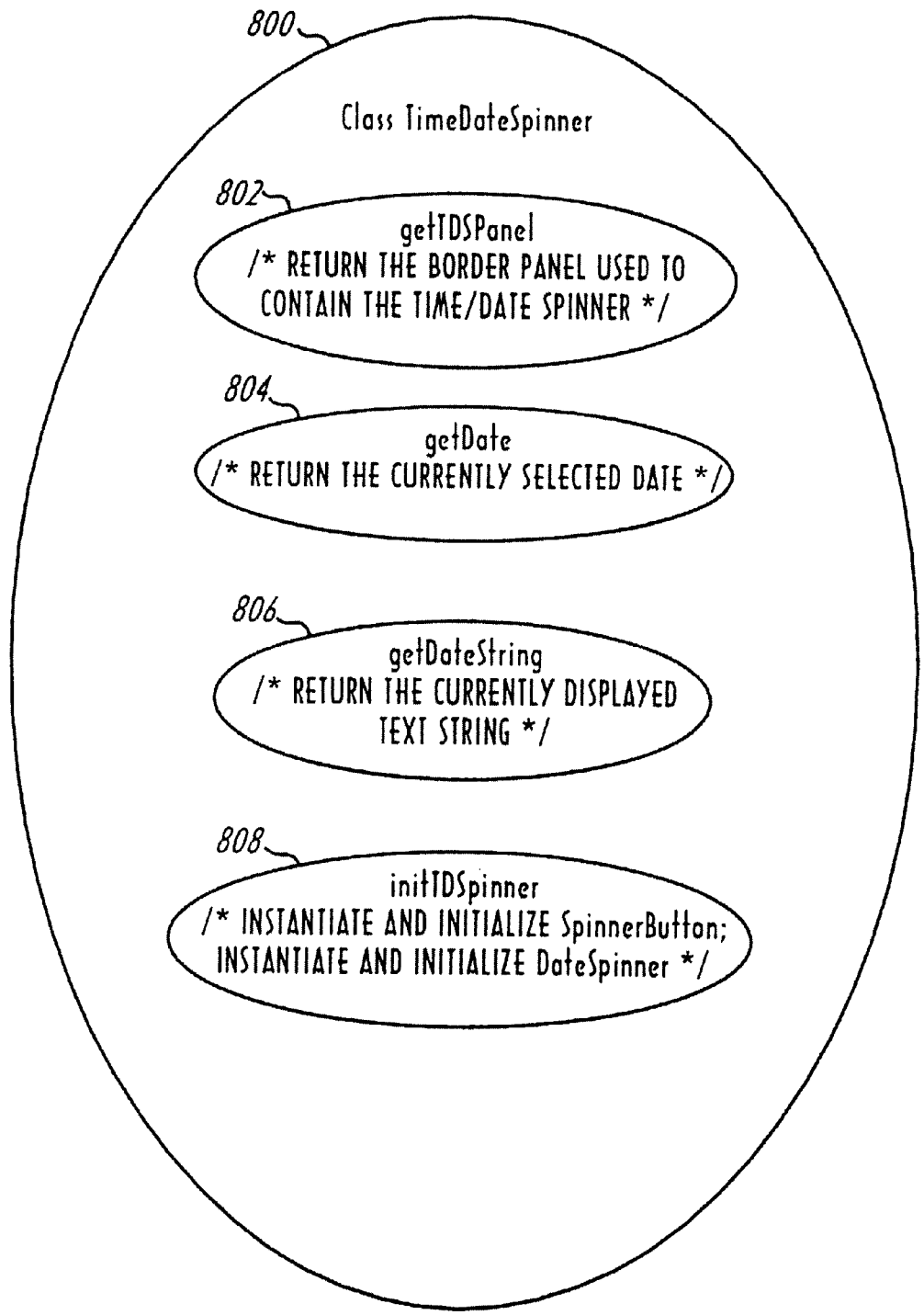
FIG. 8 is a block diagram of an example TimeDateSpinner class in accordance with the invention.

FIG. 8 is a block diagram of an example TimeDateSpinner class 800 in accordance with the invention. TimeDateSpinner class 800 includes public methods getTDSPanel 802, getDate 804, getDateString 806, and initTDSpinner 808. Method initTDSpinner 808 instantiates a new SpinnerButton object 634 and a new DateSpinner object 632, which is preferably passed a type to set up either a date spinner or a time spinner. Method getDateString 806 returns a string representing the currently selected time and or date. Method getDate 804 returns the currently selected date. Method getTDSPanel 802 returns the containing border panel for the date time spinner components. Illustrative embodiments of the Java® class definition of class TimeDateSpinner 800 is shown in Appendix A at Section A.3.

Figure 9:
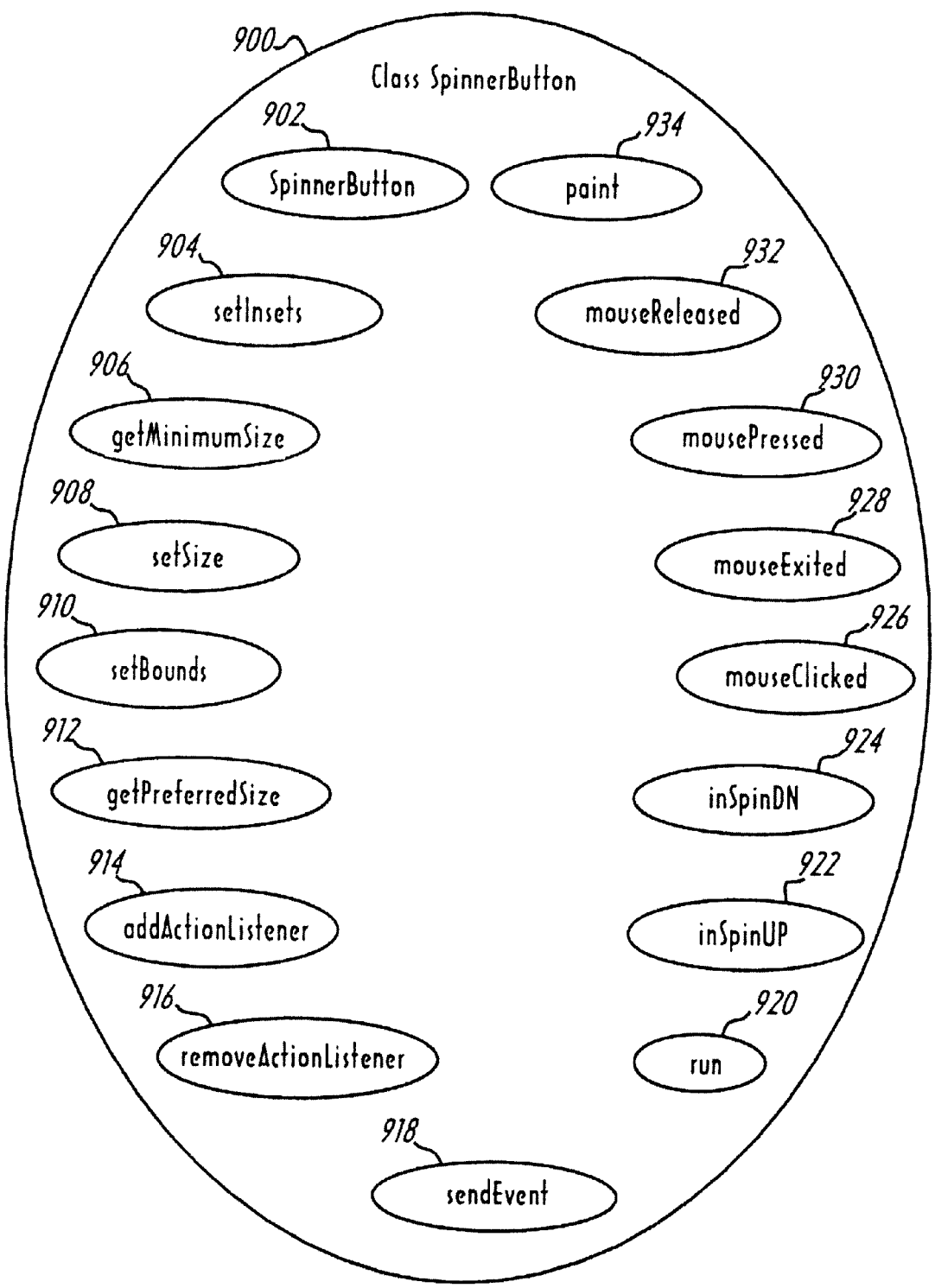
FIG. 9 is a block diagram of an example SpinnerButton class in accordance with the invention.

FIG. 9 is a block diagram of an example SpinnerButton class 900 in accordance with the invention. SpinnerButton class 900 includes public methods SpinnerButton 902, setInsets 904, getMinimumSize 906, setSize 908, setBounds 910, getPreferredSize 912, addActionListener 914, removeActionListener 916, sendEvent 918, run 920, inSpinUP 922, inSpinDN 924, mouseClicked 926, mouseExited 928, mousePressed 930, mouseReleased 932, and paint 934. Method SpinnerButton 902 initializes the default characteristics for a spinner button. Method setInsets 904 sets the insets for the spinner button panel. Method getMinimumSize 906 returns the minimum size used by the spinner buttons. Method setSize 908 resizes the spinner buttons. Method setBounds 910 reshapes the spinner button panel. Method getPreferred Size 912 returns a dimension which is the preferred size of the spinner button panel. Method addActionListener 914 adds the specified action listener to the list of ActionListeners to receive events from this component. Method removeActionListener 916 removes the specified action listener from the list of ActionListeners to receive events from this component. Method sendEvent 918 sends the specified action event to the action listeners in the list of ActionListeners. Method run 920 sends a repeated up or down action event while the spin button is held. Method inSpinUP 922 returns true if the specified point is within the up spin box boundary. Method inSpinDN 924 returns true if the specified point is within the down spin box boundary. Method mouseClicked 926 is a portion of the mouse listener interface which sends an UP message if the up button is clicked or a DOWN message if the down button is clicked. Method mouseExited 928 unselects the up and down buttons and stops the spinning thread if the user has exited the spinner button panel. Method mousePressed 930 sends an appropriate event if the user has clicked on a spinner button, and continues to send them until the mouse button is released. Method mouseReleased 932 unselects the buttons and stops sending spin UP or spin DOWN actions if the user has released the mouse button. Method paint 934 draws the spinner buttons on the display. The SpinnerButton class implements the scrollbar comprising the up and down arrows. When the user clicks one of the up or down arrow button, a message is sent from the SpinnerButton object to the DateSpinner to instruct it to spin the date in the direction indicated by the arrow button. For example, if the user selects the up arrow, which indicates that they want to scroll up, SpinnerButton object invokes a method of the DateSpinner object which increments the date. If the user selects the down arrow, which indicates that they want to scroll down, SpinnerButton object invokes a method of the DateSpinner object which decrements the date. Illustrative embodiments of the Java® class definition of class SpinnerButton 900 is shown in Appendix A at Section A.4.

Figure 10:
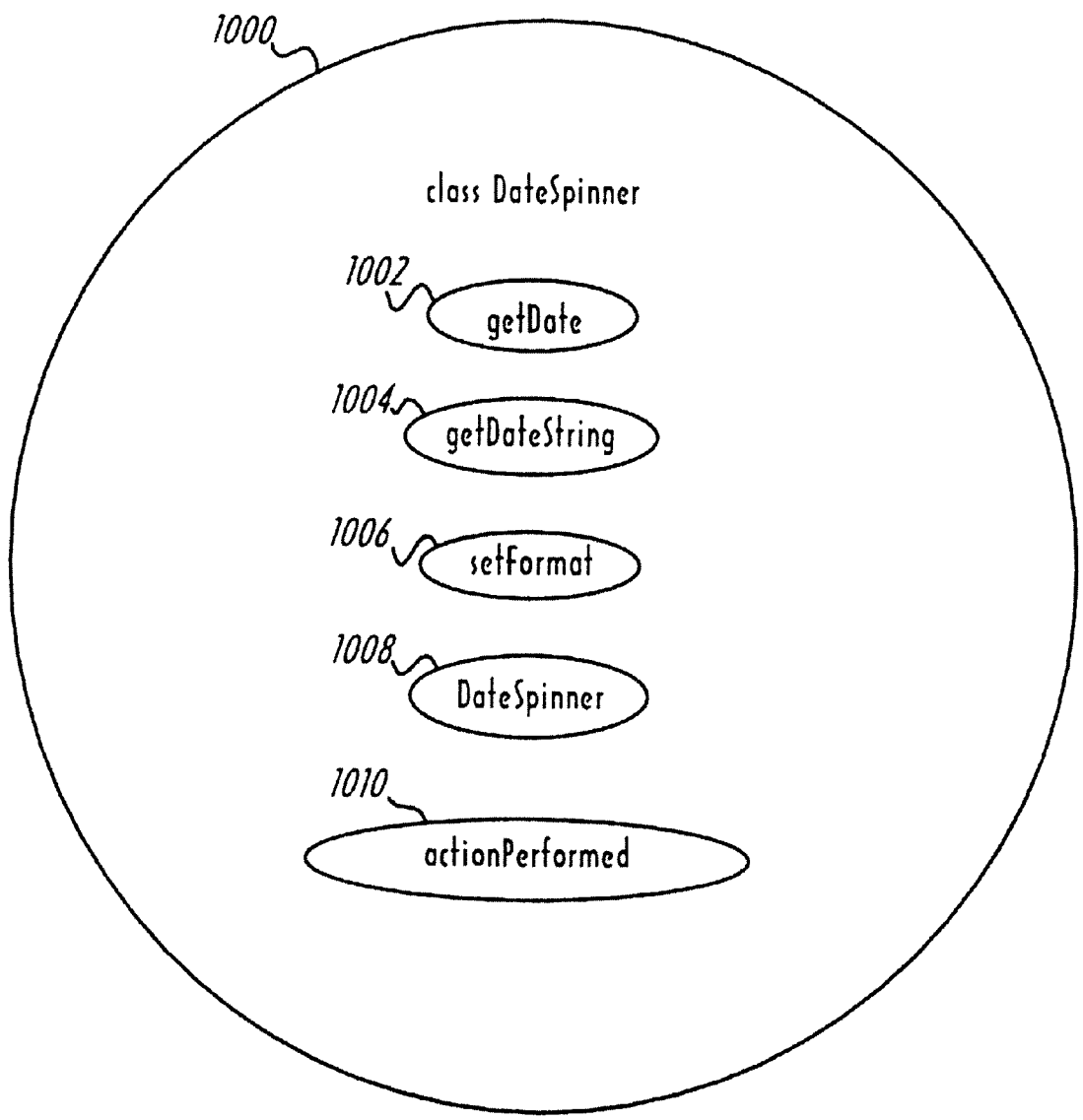
FIG. 10 is a block diagram of an example DateSpinner class in accordance with the invention.

FIG. 10 is a block diagram of an example DateSpinner class 1000 in accordance with the invention. DateSpinner is responsible for figuring out how to spin the date and or time from the current value of the selected field to the next enumerated value for the selected field. DateSpinner class 1000 includes public methods getDate 1002, getDateString 1004, setFormat 1006, DateSpinner 1008, and actionPerformed 1010. Method getDate 1002 returns the current date and or time being displayed. Method getDateString 1004 returns the string currently being displayed for the date/time. Method setFormat 1006 sets the date or time format based on whether the instance of the DateSpinner object is a date spinner, a time spinner, or both. Constructor method DateSpinner 1008 creates a date spinner of the requested type (i.e., date, time or both). Method actionPerformed 1010 rolls the selected field up or down based upon the type of action received. Illustrative embodiments of the Java® class definition of class SpinnerButton 900 is shown in Appendix A at Section A.5.

Figure 11:
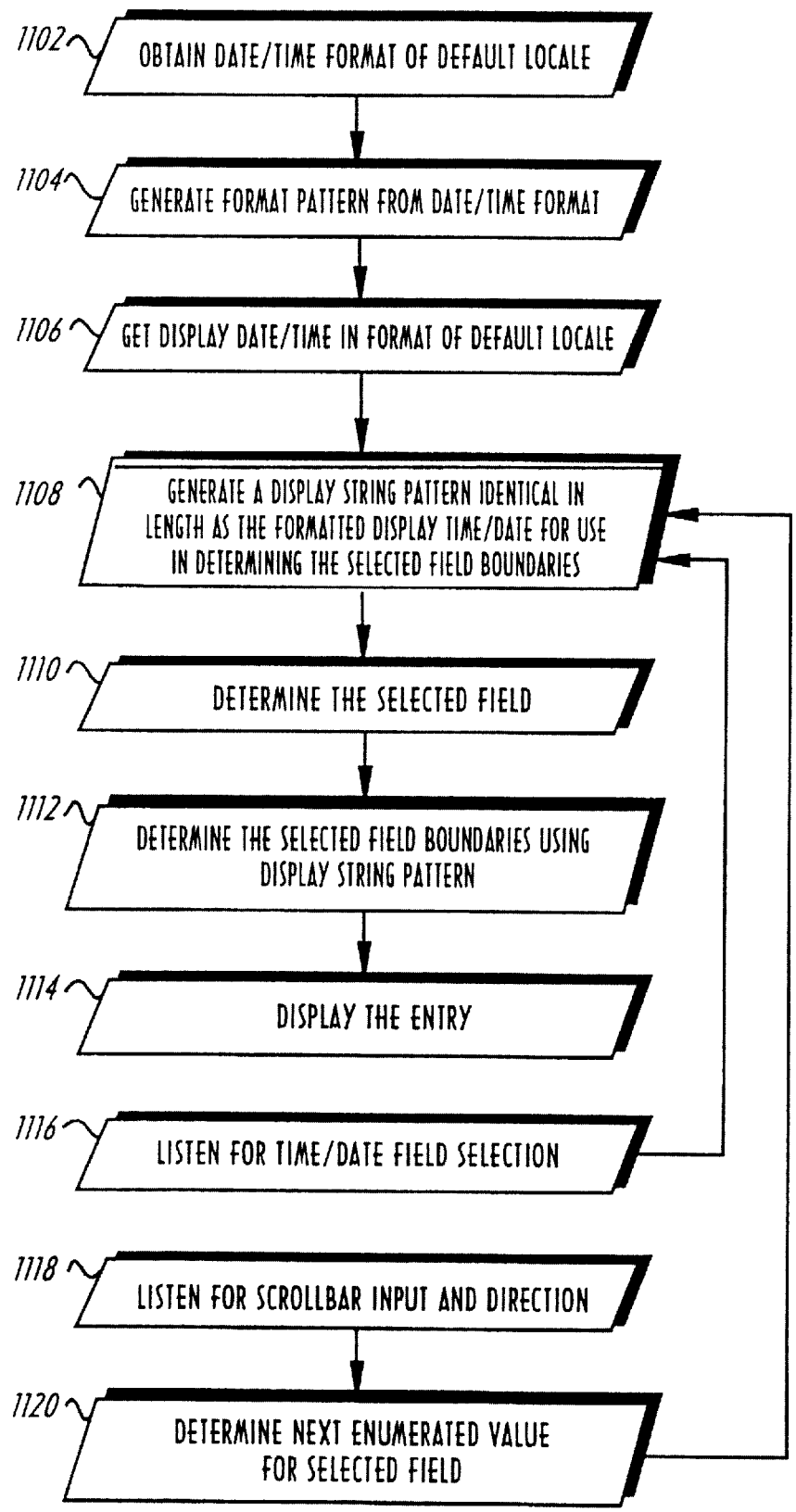
FIG. 11 is a flowchart of the operation of the locale independent date/time spinner of the invention.

FIG. 11 is a flowchart of the operation of the locale independent date/time spinner of the invention, which in the illustrative embodiment is implemented by DateSpinner class 1000 and executed by date spinner object 630 and time spinner object 640. The locale independent date/time spinner performs a first step 1102 of obtaining the date and or time, as appropriate to the particular type of the spinner 630 or 640, in the format specified by the user's default locale. In the illustrative embodiment, this is accomplished by the setFormat method 1006, which obtains the date/time in the format of the default locale using Java® constructors DateFormat.getDateInstance(), DateFormat.getTimeInstance(), and or DateFormat.getDateTimeInstance(), depending on spinner type. DateFormat is a defined class in the Java® Developer's Toolkit used for obtaining the current date/time, setting the current date/time, and for formatting the current date/time in the format of the default or another specified locale.

The Locale independent date/time spinner performs a step 1104 of generating a format pattern from the date/time format string. The obtained date/time is converted to a date/time format string. This is accomplished in the illustrative embodiment by a method call on Java® constructor SimpleDateFormat, which converts a date/time instance to a string. The Java® SimpleDateFormat class uses defined format syntax rules to specify the format of a date or time. A few of the more relevant syntax rules are shown below in Table 1.

TABLE 1

| Symbol | Meaning | Presentation | Example |
|---|---|---|---|
| y | Year | (Number) | 1996 |
| M | Month in year | (Text & Number) | July & 07 |
| d | Day in month | (Number) | 10 |
| h | Hour in am/pm (1~12) | (Number) | 12 |
| H | Hour in day (0~23) | (Number) | 0 |
| m | Minute in hour | (Number) | 30 |
| s | Second in minute | (Number) | 55 |
| E | Day in week | (Text) | Tuesday |
| a | AM/PM marker | (Text) | PM |
| z | Time zone | (Text) | Pacific Standard Time |

In step 1106, the locale independent date/time spinner of the invention retrieves the current date, time from the user's environment, or obtains a user-specified date/time, and formats it in accordance with the format of the default locale. The current date/time is obtained from the object created by the DateFormat.getDateTimeInstance().

As an example, a date/time format string returned by the SimpleDateFormat class when the default locale is the United States, might be "d-MMM-yy". From Table 1, a single "d" character results in the short form of the day, three "M" characters results in the abbreviated form of the month, and a double "y" character results in the short form of the year. Accordingly, if the date to display is Jan. 1, 1999, the resulting displayed date would look Like "1-JAN-99". As another example, if the time format string is "h:mm a", the resulting display shows a short form of the hour, a full form for the minutes, and a time of day indicator for AM or PM. Accordingly, a time of six-thirty in the morning results in a displayed time of "6:30 AM".

In step 1108, the locale independent date/time spinner generates a display string pattern that is the exact length as the formatted display date/time. The display string pattern is used to determine the boundaries of the selected date/time field, which is important in displaying the selected date/time field. For example, if the format pattern is "dd-MMMM-yyyy", the formatted date for Jan. 1, 1999 would be "01-January-1999". The results of step 1108 would generate a display string pattern of "dd-MMMMMMM-yyyy".

The locale independent date/time spinner then detects when and determines which date/time field has been selected in step 1110 (e.g., day field 142, month field 144, or year field 146 of date 140, or hour field 152, minutes field 154, seconds field 156, or time-of-day field 158 of time 150 in display 100 of FIGS. 1–3). A conventional input detector mechanism may be used to implement this step, such as a mouseListener object.

In step 1112, the boundaries of the selected field, if a field is selected, are determined by comparing the position of the cursor in the selected field to its corresponding position in the display string pattern and calculating where the selected field begins and ends. If the position of the cursor on the display 100 is not in any field, all fields are displayed as unselected. If the position of the cursor on the display 100 is in a date/time field and the position has been applied (i.e., clicked), the boundaries of the selected field are calculated. For example, if the user clicked between "u" and "a" of "January" in the displayed month field, the position of the cursor in the date/time panel "01-Janu^ary-1999" is matched to the identical position in the display string pattern (i.e., at "dd-MMMM^MMM-yyyy") (Note: "^" indicates the selected position for illustration purposes only and is not included in the string). The preceding and succeeding characters in the display string pattern are compared to the selected format character (i.e., "M") of the current cursor position to determine the position of the beginning end ending of the selected field corresponding to the selected format character "M" in the display string pattern. The beginning and ending of the selected field in the display string pattern then identically match the beginning and ending boundaries of the selected field in the formatted date/time.

In step 1114, the formatted date/time is displayed, highlighting the selected field according to the calculated selected field boundaries, if a field has been selected.

The locale independent date/time spinner includes a step 1116 for listening for field selection input. In the illustrative embodiment, field selection input detection and positioning is implemented using standard mouse class functionality. Steps 1108, 1110, 1112 and 1114 are repeated to update the display 100 to highlight the selected field.

The locale independent date/time spinner also includes a step 1118 for listening for scrollbar input. In the illustrative embodiment, this is implemented as date spinner's SpinnerButton object 632 and time spinner's SpinnerButton object 642. When input from a scrollbar is received, via a mouse click, keyboard command, or by another object, the input direction is determined and, in step 1120, the next enumerated value for the selected field is determined. In the illustrative embodiment, the next enumerated value for the selected field is calculated using the Java® Calendar class. The Java® Calendar class automatically increments or decrements dates and times in the format of the default locale. Steps 1108, 1110, 1112 and 1114 are then repeated to update the selected field on display 100 with the next enumerated date/time field. An example implementation of the spinning function is set forth in Appendix A, Section A.6 under method DoRolls.

Figure 12:
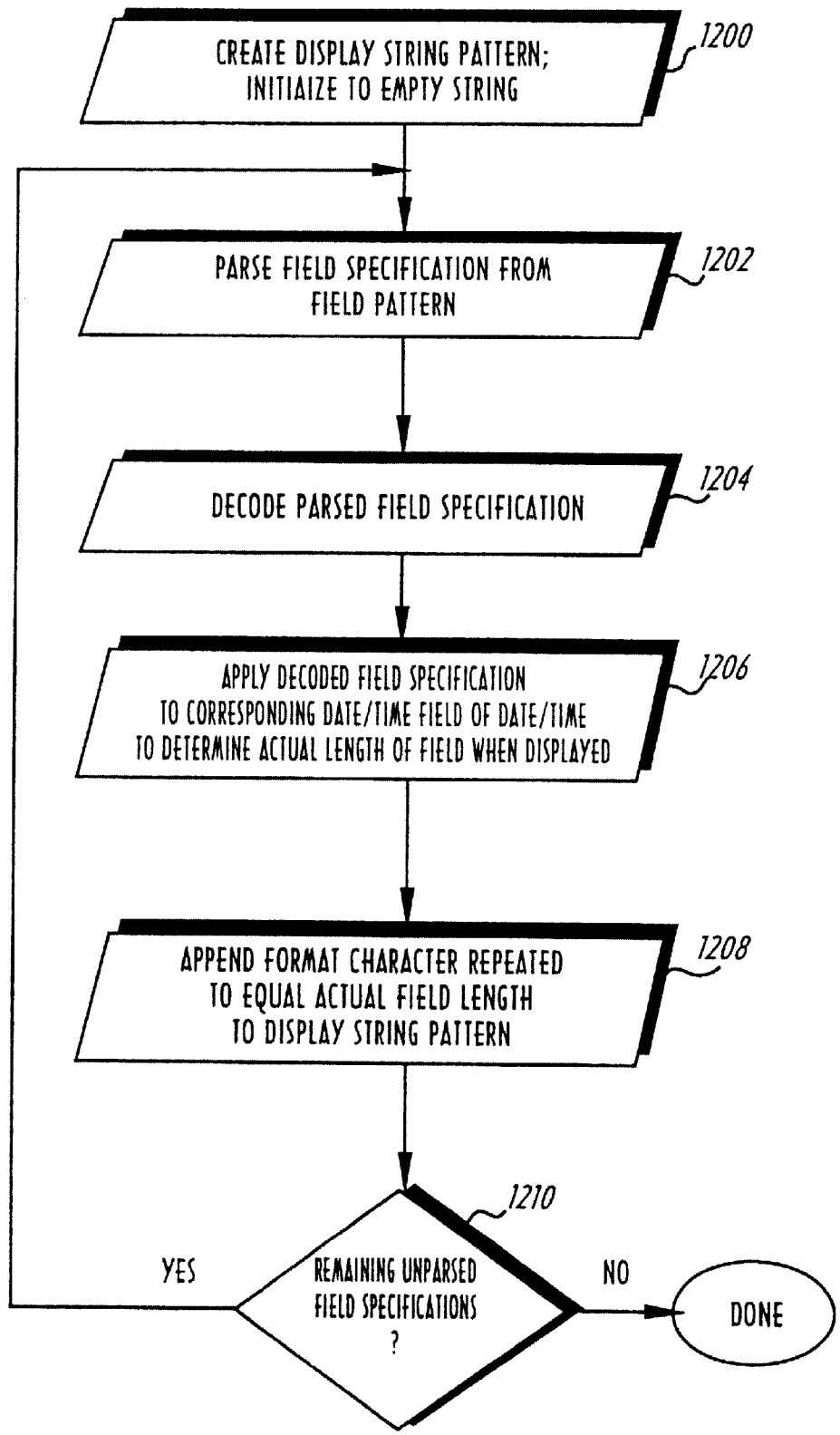
FIG. 12 is a flowchart of a method for generating a display string pattern.

FIG. 12 is a flowchart of a method for generating the display string pattern in step 1108 of FIG. 11. This method comprises a first step 1200 of creating a display string pattern initialized to an empty string. In a step 1202 a field specification is parsed from the format pattern. For example, if the format pattern is "MMMM d, yyyy", the first field specification "MMMM" is parsed from the format pattern. In a step 1204 the parsed field specification "MMMM" is decoded to determine the format of the field when the date/time is displayed. In this example, four or more "M" characters is defined in the Java® SimpleDateFormat to be the full text of the month to be displayed. In a step 1206 the format of the parsed field specification is applied to the field in the date/time to be displayed to determine the actual length of the field when formatted for display.

Accordingly, if the date/time to be displayed is "Jan. 1, 1999", the actual length of the month field (i.e., "January") is seven characters. In a step 1208, a format character, which indicates the corresponding field of the parsed field specification, repeated a number of times equal to the actual length of the field when formatted for display, as determined in step 1206, is appended to the display string pattern. Thus, in the current example, the characters "MMMMMMM" are appended to the display string pattern. The method includes a step 1210 in which it is determined whether more field specifications remain to be parsed from the format pattern. If so, steps 1202 through 1210 are repeated until no more field specifications in the format pattern remain to be parsed. Accordingly, in the current example, the field separator """ is the next parsed field specification, which is directly appended to the display string pattern such that at the end of this iteration the display string pattern contains the pattern "MMMMMMM". On the next iteration, the field specification "d" is parsed. The single "d" is decoded to mean that a minimum of one digit representing the day of the month is to be displayed. In the current example, since the day of the month to be displayed is "15", the actual length is two characters. Accordingly, two format characters indicating that they are part of the day of the month field are appended to the display string pattern, resulting in a display string pattern of "MMMMMMM dd" at the end of this iteration. On the next two iterations, the field separators "," and """ are parsed and appended to the display string pattern, resulting in a display string pattern of "MMMMMMM dd, ". On the final iteration, the field specification "yyyy" is parsed, decoded to mean display a minimum of four digits when representing the year, and the final display string pattern is "MMMMMMM dd, yyyy". One implementation of this function is illustrated in Appendix A, Section A.6, method calculateEntryPattern. The display string pattern is used to determine the selected field boundaries based on where in the selected field the mouse was clicked, which is used to keep track of the boundaries of the highlighted portion of the date/time panel.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A locale-independent method for spinning a date and or time (date/time) on a computer display screen of a computer running in a user's locale, said date/time comprising a plurality of fields, said method comprising the steps of:

obtaining a date/time format of said user's locale;

generating a format pattern from said date/time format, said format pattern comprising a plurality of field specifications describing a length and format of each of said plurality of fields of said date/time;

formatting said date/time into a formatted date/time, said formatted date/time comprising a plurality of formatted fields, each of said plurality of formatted fields comprising a corresponding one of said fields of said date/time formatted into said length and said format specified by said corresponding field specification in said format pattern;

displaying said formatted date/time on said computer display screen;

detecting a currently selected field, said currently selected field being a selected one of said plurality of formatted fields of said formatted date/time;

detecting a spin direction, said spin direction indicating whether to increment or decrement said selected field;

determining a next field value, said next field value being a next enumerated value of said selected field in a direction corresponding to said spin direction;

formatting said next enumerated value into said length and said format selected field; and displaying said formatted next enumerated value in place of said selected field in said displayed formatted date/time on said computer display screen.

2. A method in accordance with claim 1, wherein said second displaying step comprises:

highlighting said selected formatted field on said computer display screen.

3. A method in accordance with claim 2, comprising:

generating a display string pattern from said format pattern, said display string pattern comprising a plurality of display string fields of length equal to a corresponding one of said plurality of formatted fields of said formatted date/time, and each corresponding to said field specification in said format pattern that corresponds to said formatted field.

4. A method in accordance with claim 3, said generating step comprising:

creating said display string pattern, said display string pattern comprising a string initialized to an empty string;

parsing a field specification from said format pattern;

decoding said field specification to determine a length parameter and a format parameter;

applying said decoded field specification to said formatted field of said formatted date to determine an actual length of said formatted field;

appending a display string field to said display string pattern, said display string field comprising a number of format characters which indicate that said character belongs to said display string field, said number being equal to said actual length of said formatted field and said format characters being unique for each different display string field; and repeating said parsing step through said appending step if any of said plurality of field specifications in said format pattern remain unparsed.

5. A method in accordance with claim 4, wherein:

said first detecting step comprises:

detecting a cursor position in said displayed formatted date/time;

matching said cursor position to an analogous selected position in said display string pattern;

determining display string field boundary positions of said display string field in said display string pattern;

matching said display string field boundary positions to analogous selection boundaries in said displayed formatted date/time; and said highlighting step comprises:

highlighting a portion of said displayed formatted date/time between said analogous selection boundaries.

6. A localizable date and or time (date/time) formatting mechanism, comprising:

date/time format detection means which detects a format specified by a user's locale;

a date/time display panel displaying a date/time in said format specified by said user's locale, said date/time comprising a plurality of fields and said date/time display panel comprising a plurality of independently selectable fields that each correspond to and display a different one of said plurality of fields of said date/time in said format specified by said user's locale;

field selection detection means for detecting a selected field, said selected field comprising one of said independently selectable fields;

direction selection means, said direction selection means detecting a spin direction indicating whether to advance said displayed date forward or decrement said displayed date in reverse;

spinning means responsive to said field selection detection means and said direction selection means that calculates a next enumerated value of said selected field, formats said next enumerated value in said format specified by said user's locale, and displays said formatted next enumerated value in said selected field.

7. A mechanism in accordance with claim 6, wherein:

said field selection detection means comprises:

an input device which detects a desired position in said display panel;

a position decoder responsive to said desired position which calculates said selected field based on said desired position.

8. A mechanism in accordance with claim 7, wherein:

said field selection detection means highlights said displayed selected field.

9. A method in accordance with claim 7, wherein:

said direction selection means comprises:

a direction input device which detects direction input on said scrollbar panel;

a direction decoder responsive to said direction input which calculates said spin direction.

\* \* \* \* \*